(12) United States Patent  
Katayama

(10) Patent No.: US 8,068,717 B2  
(45) Date of Patent: Nov. 29, 2011

(54) TELEVISION PROGRAM RECORDING/REPRODUCING DEVICE

(75) Inventor: Takahiro Katayama, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1577 days.

(21) Appl. No.: 11/267,192

(22) Filed: Nov. 7, 2005

(65) Prior Publication Data

US 2006/0101493 A1 May 11, 2006

(30) Foreign Application Priority Data

Nov. 5, 2004 (JP) .................................. 2004-321840

(51) Int. Cl.  
*H04N 9/80* (2006.01)

(52) U.S. Cl. ...................................................... 386/239

(58) Field of Classification Search .................. 386/46  
See application file for complete search history.

(56) References Cited

U.S. PATENT DOCUMENTS

| 2002/0146235 A1 | 10/2002 | Watanabe et al. | |
|---|---|---|---|
| 2002/0186423 A1* | 12/2002 | Okajima et al. | 358/474 |
| 2008/0229361 A1* | 9/2008 | Jerding et al. | 725/46 |

FOREIGN PATENT DOCUMENTS

| JP | 9-154078 A | 6/1997 |
|---|---|---|
| JP | 11-136340 A | 5/1999 |
| JP | 11-296273 A | 10/1999 |
| JP | 2002-230946 A | 8/2002 |
| JP | 2002-369108 A | 12/2002 |

OTHER PUBLICATIONS

Japanese Office Action dated Dec. 16, 2008 with English translation (four (4) pages).

* cited by examiner

*Primary Examiner* — William Vaughn, Jr.  
*Assistant Examiner* — Asher Khan  
(74) *Attorney, Agent, or Firm* — Crowell & Moring LLP

(57) ABSTRACT

A television program recording/reproducing device displays a reproduction program selection screen containing a title list image, a cursor image, frame images for initial letter selection and frame images for second letter selection. The title list image displays multiple title images sequentially in alphabetical order. One frame image for initial letter selection is displayed for multiple same titles, if any, while one frame image for second letter selection is displayed for multiple titles having the same initial letter, if any, in the title list image. The cursor image is moved on and between the title images and the both frame images. This television program recording/reproducing device allows a user to more effectively search for and find a desired television program to be reproduced, and can mitigate the burden on the user in an operation of reproducing a television program.

3 Claims, 4 Drawing Sheets

TELEVISION PROGRAM RECORDING/REPRODUCING DEVICE

BACKGROUND OF THE INVENTION

1. Field of the Invention

The present invention relates to a television program recording/reproducing device for recording a television program transmitted on a television broadcast signal, and/or reproducing the recorded television program.

2. Description of the Related Art

A television program recording/reproducing device is known, which records and stores, in a built-in recording medium such as a hard disk, television programs transmitted on television broadcast signals, and which enables optional selection and reproduction of the thus stored television programs. In recent years, the size of data which can be stored in a recording medium of a television program recording/reproducing device is significantly increasing to enable storage of mass television programs. This conversely places a burden on a user to search for and find a television program, which the user wishes to reproduce, from mass television programs stored in a recording medium.

In the case of digital television broadcast, this burden is considered to be mitigated by using EPG (Electric Program Guide). For the purpose of displaying an EPG screen, a digital television broadcast signal contains EPG data of a television program containing a program title, a description of the content of the program, broadcast date/time of the program, and so on. Thus, a television program recording/reproducing device for recording and/or reproducing a television program transmitted on a digital television broadcast signal acquires a program title and broadcast date/time of the television program from the EPG data at the time of recording the television program, and records and stores the program title and the broadcast date/time along with video data and audio data of the television program. When reproducing a recorded television program, the television program recording/reproducing device displays, on a display, a title list image (title list screen) formed of a list of the recorded titles of television programs so as to allow a user to select a title of the television program, which the user wishes to reproduce, from the title list image and to reproduce video data and audio data recorded corresponding to the selected title.

A conventional title list image displays titles of television programs each with broadcast date/time in order of broadcast date/time. Furthermore, not only the title list image, but also a cursor image for selecting a title of a television program from the titles in the title list image is displayed on the same screen, in which each time a cursor key of a remote control is pressed, the cursor image is moved one row to next row (i.e. to next title) in the rows of titles, namely moved on the titles from one title to the next title one by one. Note that if the number of television programs is too many to display the titles of all the television programs on one title list image, and when the cursor image moves to the lowermost (or uppermost) row in the title list image, the title list image is scrolled upward (or downward) to the next title list image.

For selecting a television program to be reproduced, a user searches for and finds a title of the television program, to be reproduced, from the title list image displaying titles of television programs sequentially in order of broadcast date/time, and operates a remote control to move the cursor onto the title of the television program to be reproduced. In this way, the conventional television program recording/reproducing device for recording and/or reproducing television programs transmitted on digital television broadcast signals mitigates the burden on the user at the time of reproducing a television program.

The following describes some known devices for selecting and reproducing desired television programs from recorded television programs. In one such known television program recording/reproducing device, a list of titles of the recorded television programs is displayed on a display, and a cursor is moved by a user to select a program title from the title list, whereby multiple television programs, each provided with the selected program title, are sequentially reproduced in a predetermined order for such television programs (refer to e.g. Japanese Laid-open Patent Publication 2002-230946).

In a further known television program recording/reproducing device for selecting and reproducing a desired television program, a list of program information of recorded television programs including their titles is displayed on a display, and a cursor is moved by a user to select a television program from the list, whereby detailed information of the selected television program is displayed on the display (refer to e.g. Japanese Laid-open Patent Publication 2002-369108). In a still further known television program recording/reproducing device, when recording a television program, a list of program information of television programs, each including the title and broadcast date/time, is displayed on a display sequentially in alphabetical order of the titles of the television programs, whereby when a cursor is moved by the user to select a television program from the list, the selected television program is recorded on the device (refer to e.g. Japanese Laid-open Patent Publication Hei 9-154078).

In the above conventional television program recording/reproducing devices, a cursor image is moved one row upward or downward to next row in the rows of titles, each time a user presses a cursor key of a remote control. Accordingly, the user is required to perform many cursor movement operations in order to move the cursor image to search for a desired title. Thus, when it is required to scroll a title list image upward (or downward) to the next title list image, the user has to move the cursor image to the lowermost (or uppermost) title, which requires many cursor movement operations by the user. As a result, much labor and time are required to search for a desired title, especially in the case of such scrolling. Even when the user finds the title of the desired television program in a title list image currently on the display, the user is still required to perform many cursor movement operations to move the cursor image onto the found title. Consequently, much labor and time are again required to select the desired title after finding it.

Thus, the conventional television program recording/reproducing devices require many cursor movement operations by a user to search for, find and select a desired television program to be reproduced, thereby causing much labor and time. This problem cannot be solved by using the technologies disclosed in the above patent publications.

SUMMARY OF THE INVENTION

An object of the present invention is to provide a television program recording/reproducing device that allows a user to more effectively search for and find a desired television program to be reproduced, and can mitigate the burden on the user in an operation of reproducing a television program.

According to the present invention, the object is achieved by a television program recording/reproducing device comprising: a tuner for receiving a television broadcast signal transmitted from a broadcast station; a filter for subjecting the television broadcast signal received by the tuner to signal processing to separate, from the received television broadcast signal, video data, audio data and EPG (Electric Program Guide) data of a television program; a program recording unit for recording video data and audio data of each television program, separated by the filter, so as to be readable; a video decoder for subjecting the video data of each television program separated by the filter and video data of each television program read from the program recording unit to signal processing to generate video signals for reproducing video of each television program on a display connected to the television program recording/reproducing device; an audio decoder for subjecting the audio data of each television program separated by the filter and audio data of each television program read from the program recording unit to signal processing to generate audio signals for reproducing audio of each television program to a speaker connected to the television program recording/reproducing device; an operation unit operated to command various operations of the television program recording/reproducing device; a program recording control unit for controlling a recording operation of recording the video data and audio data of each television program separated by the filter onto the program recording unit; a program information display control unit for controlling a display operation of displaying, on the display, information about the video data and audio data of each television program recorded on the program recording unit; and a program reproduction control unit for controlling reading of the video data and audio data of each television program recorded on the program recording unit, and further controlling outputting of these data to the video decoder and the audio decoder.

Therein, the program recording control unit records, on the program recording unit, the video data and audio data of the each television program separated by the filter by associating these video and audio data of the each television program with a title of the each television program contained in the EPG data of the each television program separated by the filter. The program information display control unit displays, on the display, a title list image containing a list of titles of the television programs recorded on the program recording unit as well as a cursor image for selecting a title of an optional television program from the title list image, and moves the cursor image on the titles of the title list image according to operation of the operation unit. The program reproduction control unit reads, from the program recording unit, video data and audio data of a television program corresponding to the title selected by the cursor image, and outputs the read video data and audio data of the television program to the video decoder and the audio decoder, respectively. The program information display control unit displays the titles of the television programs sequentially in alphabetical order or syllabary order on the title list image. If the title list image has multiple titles having the same initial letter, the program information display control unit displays a frame image for initial letter selection for the multiple titles having the same initial letter, the cursor image being movable on the frame image(s) for initial letter selection. Further, the program information display control unit moves the cursor image on the titles of the title list image and on the frame image(s) for initial letter selection.

The television program recording/reproducing device according to the present invention as described above makes it possible to move the cursor image to a position or row, or a neighboring position or row, of a desired title of a television program, to be reproduced, with a higher probability of a smaller number of operations of pressing the cursor keys by moving the cursor image on and between the frame images for initial letter selection than by moving the cursor image on and between the titles. Thus, by first moving the cursor image on and between the frame images for initial letter selection, and then moving the cursor image on and between the titles, a desired title can be selected by the cursor image with a higher probability of a smaller number of operations of pressing the cursor keys than by directly moving the cursor image on and between the titles. This makes it possible to mitigate the burden on a user in an operation of reproducing a television program, and allows the user to easily and quickly reproduce a desired television program.

Preferably, if the multiple titles having the same initial letter contain multiple titles having the same second letter, the program information display control unit displays a frame image for second letter selection for the multiple titles having the same second letter, the cursor image being movable on the frame image(s) for second letter selection, wherein the program information display control unit moves the cursor image on the titles of the title list image, and on the frame image(s) for initial letter selection, and further on the frame image(s) for second letter selection.

According to the television program recording/reproducing device according to the preferred mode, by first moving the cursor image on and between the frame images for initial letter selection, and then moving the cursor image on and between the frame images for second letter selection, and thereafter moving the cursor image on and between the titles, a desired title can be selected by the cursor image with a higher probability of a still smaller number of operations of pressing the cursor keys than by directly moving the cursor image on and between the titles.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

The best modes and preferred embodiments of the present invention will be described hereinafter with reference to the annexed drawings. The specific embodiments described are not intended to cover the entire scope of the present invention, and hence the present invention is not limited to only the specific embodiment.

Figure 1:
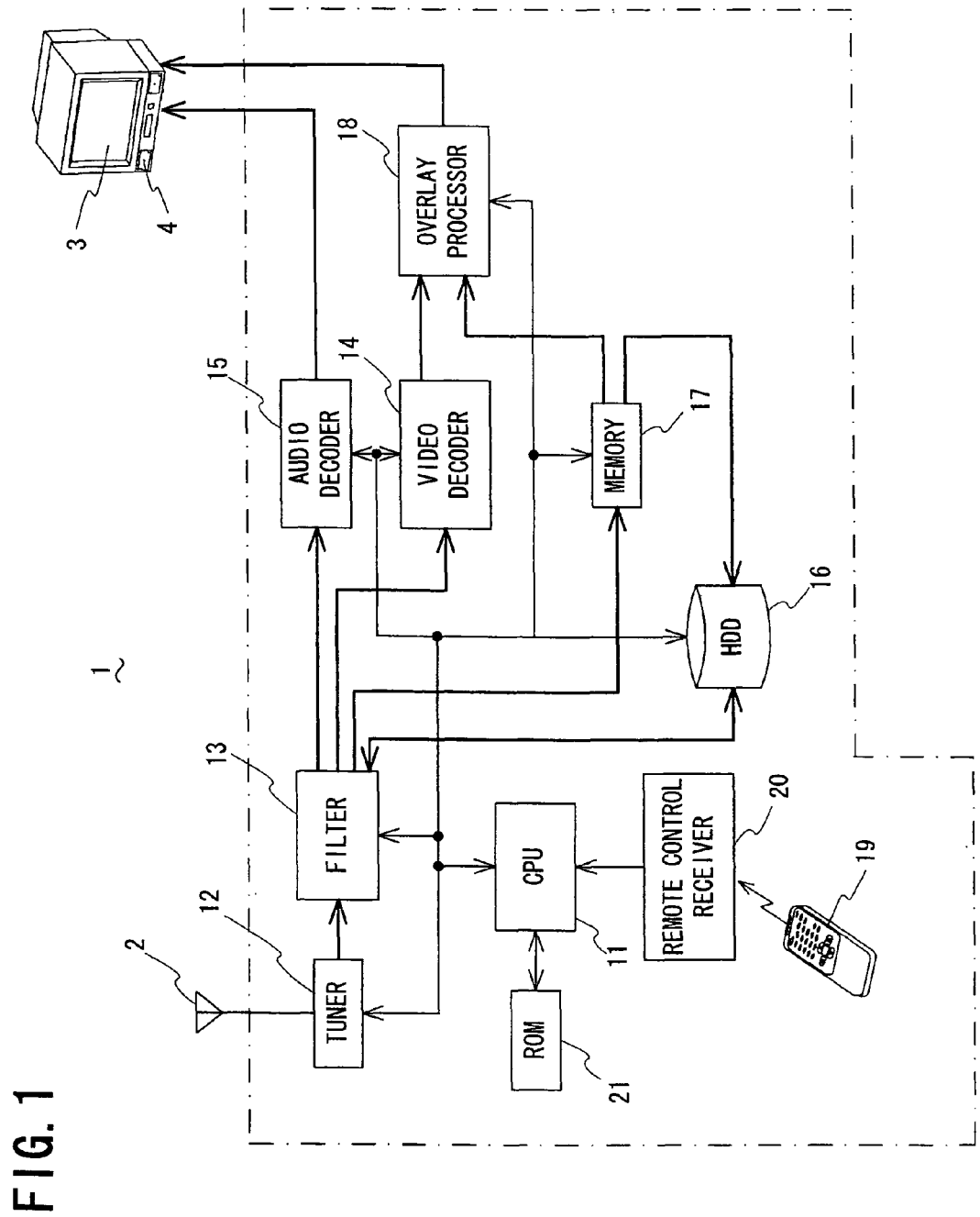
FIG. 1 is a schematic block diagram of a television program recording/reproducing device according to an embodiment of the present invention.

FIG. 1 is a schematic block diagram of a television program recording/reproducing device 1 according to an embodiment of the present invention. Referring to the block diagram of FIG. 1, the television program recording/reproducing device 1 receives a television broadcast signal transmitted from a broadcast station via an antenna 2 connected to the television program recording/reproducing device 1, and records thereon a television program transmitted on the television broadcast signal. In the present embodiment, the television broadcast signal is assumed to be a digital signal. Further, the television program recording/reproducing device 1 reproduces the recorded television program by a display 3 and a speaker 4 connected thereto. When reproducing a recorded television program by the display 3 and the speaker 4, the television program recording/reproducing device 1 displays, on the display 3, a title list image formed of a list of titles of recorded television programs so as to allow a user to select a desired television program, to be reproduced, from the title list image.

The television program recording/reproducing device 1 comprises a CPU (Central Processing Unit) 11 for controlling the television program recording/reproducing device 1 itself, a tuner 12, a filter 13, a video decoder 14, an audio decoder 15, an HDD (Hard Disk Drive) 16, a memory 17, an overlay processor 18, a remote control 19 as an operation unit, a remote control receiver 20 and a ROM (Read Only Memory) 21. As will be apparent from the description below, the HDD 16 serves as a program recording unit, while the CPU 11 serves as a program recording control unit for controlling the HDD 16, a program reproduction control unit, and a program information display control unit as well.

The CPU 11 controls the tuner 12 to tune the receiving frequency to the frequency of a digital television broadcast signal transmitted from a broadcast station so as to receive the digital television broadcast signal via the antenna 2. The digital television broadcast signal contains video data and audio data of the television program, and additionally, EPG (Electric Program Guide) data for the purpose of displaying an electric program guide. The EPG data contains a program title, a description of the content of the program, broadcast date/time of the program, and so on.

The CPU 11 controls the filter 13 to subject the digital television broadcast signal received by the tuner 12 to signal processing so as to separate video data, audio data and EPG data of the television program from the received digital television broadcast signal. The video data separated by the filter 13 is output to the video decoder 14 and the HDD 16, while the audio data separated by the filter is output to the audio decoder 15 and the HDD 16. Further, the EPG data separated by the filter is output to the memory 17.

The CPU 11 controls the video decoder 14 to subject the video data separated by the filter 13 to signal processing so as to generate a video signal for reproducing video of the television program on the display 3. The CPU 11 controls the audio decoder 15 to subject the audio data separated by the filter 13 to signal processing so as to generate an audio signal for reproducing audio of the television program to the speaker 4. The video signal generated by the video decoder 14 is output to the display 3 via the overlay processor 18, while the audio signal generated by the audio decoder 15 is output to the speaker 4. In this way, the video and audio of the television program transmitted on the television broadcast signal are reproduced by the display 3 and the speaker 4, respectively.

Under the control of the CPU 11, the video data and the audio data of the television program are recorded by the HDD 16 so as to be readable. More specifically, the CPU 11 controls the HDD 16 to record, onto a built-in hard disk(s), the video data and the audio data of the television program separated by the filter 13. Thus, the video and audio of the television program transmitted on the television broadcast signal are recorded on and stored in the HDD 16. At this time, the CPU 11 controls the HDD 16 to record the video data and the audio data of the television program, separated by the filter 13, by associating these data with a program title, broadcast time/date of the television program and so on which are obtained from the EPG data separated by the filter 13, and which are provided to the HDD 16 via the memory 17.

Further, the CPU 11 controls the HDD 16 to read video data and audio data of a television program recorded on and stored in the built-in hard disk(s). The video data and the audio data of the television program read from the HDD 16 are respectively output to the video decoder 14 and the audio decoder 15 via the filter 13. The CPU 11 controls the video decoder 14 and the audio decoder 15 to subject the video data and the audio data of the television program read from the HDD 16 so as to generate a video signal for reproducing video of the television program on the display 3 as well as an audio signal for reproducing audio of the television program to the speaker 4. In this way, the video and audio of the television program recorded on and stored in the HDD 16 are reproduced by the display 3 and the speaker 4, respectively.

Furthermore, the CPU 11 controls the HDD 16 to read a program title, broadcast date/time of a television program and so on recorded on and stored in the built-in hard disk. The program title, broadcast date/time of a television program and so on read from the HDD 16 are output to the memory 17 via the filter 13. The memory 17 stores various data including graphic data for generating on-screen images to be displayed on the display 3. The CPU 11 controls the memory 17 to temporarily store EPG data separated by the filter 13 as well as the program title, broadcast date/time of the television program and so on read from the HDD 16.

In addition, the CPU 11 controls the overlay processor 18 to superimpose, on the video signal output from the video decoder 14, an on-screen image signal for displaying an on-screen image on the display 3. Under the control of the CPU 11, the on-screen image signal is generated in a work area of the memory 17, using graphic data, EPG data, a program title(s) and broadcast date/time of a television program(s), and so on that are stored in the memory 17. The thus generated on-screen image signal is output from the memory 17. The overlay processor 18 superimposes the on-screen image signal on the video signal output from the video decoder 14 to produce a combined image signal of these two, which is then displayed on the display 3.

The remote control 19 is used or operated by a user to command various operations of the television program recording/reproducing device 1, including selection of a channel of a television broadcast signal to be received, recording of a television program transmitted on the television broadcast signal, and reproduction of the recorded television program. The remote control 19 comprises various operation keys as will be described later. Each time an operation key of the remote control 19 is pressed by the user, the remote control 19 sends a coded infrared signal corresponding to the operation of the operation key. The remote control receiver 20 receives the coded infrared signal sent from the remote control 19, and converts the received infrared signal to an electric signal so as to output, to the CPU 11, a signal corresponding to the operation of the remote control 19 by the user. The ROM 21 stores an operation program(s) of the CPU 11.

Based on the output signal from the remote control receiver 20, the CPU 11 determines the content of the operation of the remote control 19, and controls operations of the television program recording/reproducing device 1 according to the operation of the remote control 19, including a receiving operation of receiving a television broadcast signal, a recording operation of recording a television program, a display operation of displaying a reproduction program selection screen for selecting a television program, to be reproduced, from recorded television programs, and a reproduction operation of reproducing a recorded television program. For performing the recording operation of recording a television program, the CPU 11 records, onto the HDD 16, video data and audio data of a television program that are separated by the filter 13 so as to record the television program transmitted on the television broadcast signal onto the HDD 16. At this time, the CPU 11 controls the HDD 16 to record thereon the video data and the audio data of the television program by associating these data with a program title, broadcast time/date of the television program and so on, on the basis of EPG data separated by the filter 13 and stored in the memory 17.

For performing the display operation of displaying a reproduction program selection screen for selecting a television program, to be reproduced, from recorded television programs, the CPU 11 displays, on the display 3, a title list image including a list of titles of recorded television programs as information about video data and audio data of the television programs recorded on the HDD 16. Furthermore, the reproduction program selection screen displayed by the CPU 11 on the monitor 3 contains not only a title list image, but also other images including a cursor image for selecting a title of an optional television program from the title list image, and further including frame images on which the cursor image can move from one frame image to another frame image. Each time a cursor key of the remote control 19 is pressed, the cursor image is moved on titles of the title list image from one title to another, and on the frame images from one frame to another.

At this time, the CPU 11 reads from the HDD 16, and stores in the memory 17, titles and broadcast date/time of all the television programs recorded on the HDD 16. Further, the CPU 11 generates, in a work area of the memory 17, an on-screen image signal for displaying a reproduction program selection screen including a title list image, a cursor image and frame images on the basis of the titles and broadcast date/time of these television programs along with graphic data stored in the memory 17. The CPU 11 then outputs the on-screen image signal from the memory 17 to the overlay processor 18 so as to display the reproduction program selection screen including the title list image, the cursor image, the frame images, and so on, on the display 3.

For performing the reproduction operation of reproducing a television program, the user first selects a title of a television program using the cursor image on reproduction program selection screen. Then, the CPU 11 reads, from the HDD 16, video data and audio data of a television program that correspond to the title selected by the user on the reproduction program selection screen, and outputs these video data and audio data via the filter 13 to the video decoder 14 and the audio decoder 15, respectively, so as to reproduce the television program, corresponding to the selected title, by the display 3 and the speaker 4.

Figure 2:
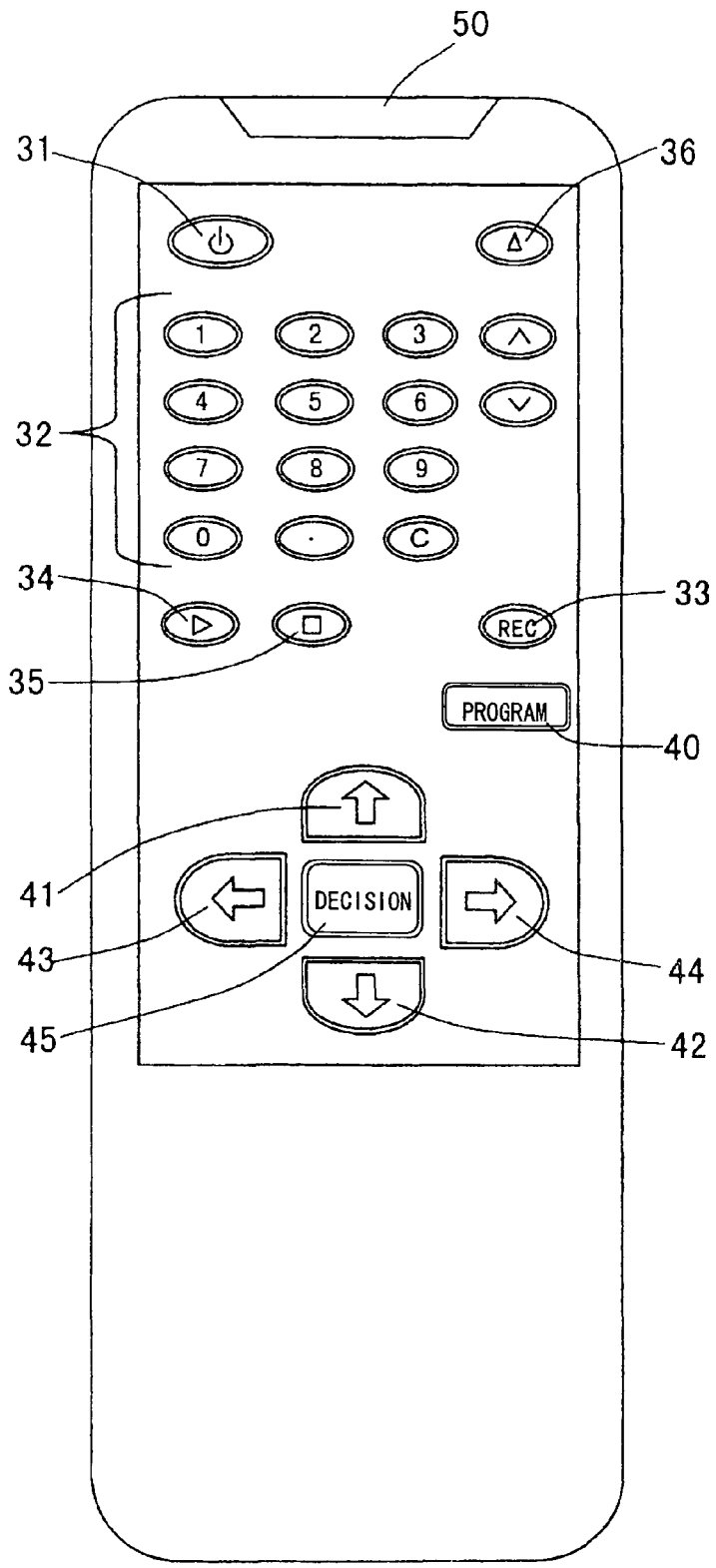
FIG. 2 is a schematic plan view of a remote control of the television program recording/reproducing device.

FIG. 2 is a schematic plan view of the remote control 19. As shown in FIG. 2, the remote control 19 comprises various operation keys to be used and operated by a user, including a power supply (on/off) key 31, numeric input keys 32, a record key 33, a reproduction key 34, a stop key 35, a menu key 36, a program key 40, cursor keys 41 to 44, a decision key 45, and so on. The remote control 19 further comprises a light emitting unit 50 for sending a coded infrared signal according to the operation of each operation key.

The power supply key 31 is used to switch on/off power supply of the television program recording/reproducing device 1, while the numeric keys 32 are used to select channels of television broadcast signals to be received. The record key 33 is used to record each television program transmitted on each television broadcast signal, while the reproduction key 34 is used to reproduce each recorded television program. The stop key 35 is used to stop recording or reproduction of a television program, while the menu key 36 is used to display, on the display 3, a menu image for making various settings of the television program recording/reproducing device 1.

The program key 40 is used to display a reproduction program selection screen for selecting a television program, to be reproduced, from recorded television programs. The cursor keys 41 to 44 are used to move a cursor image on the menu image as well as a cursor image on the reproduction program selection screen, while the decision key 45 is used to decide each of the contents selected by the cursor keys 41 to 44. According to the operation of each of these operation keys, the remote control 19 emits a coded infrared signal from the light emitting unit 50 according to each operation of each operation key.

Figure 3:
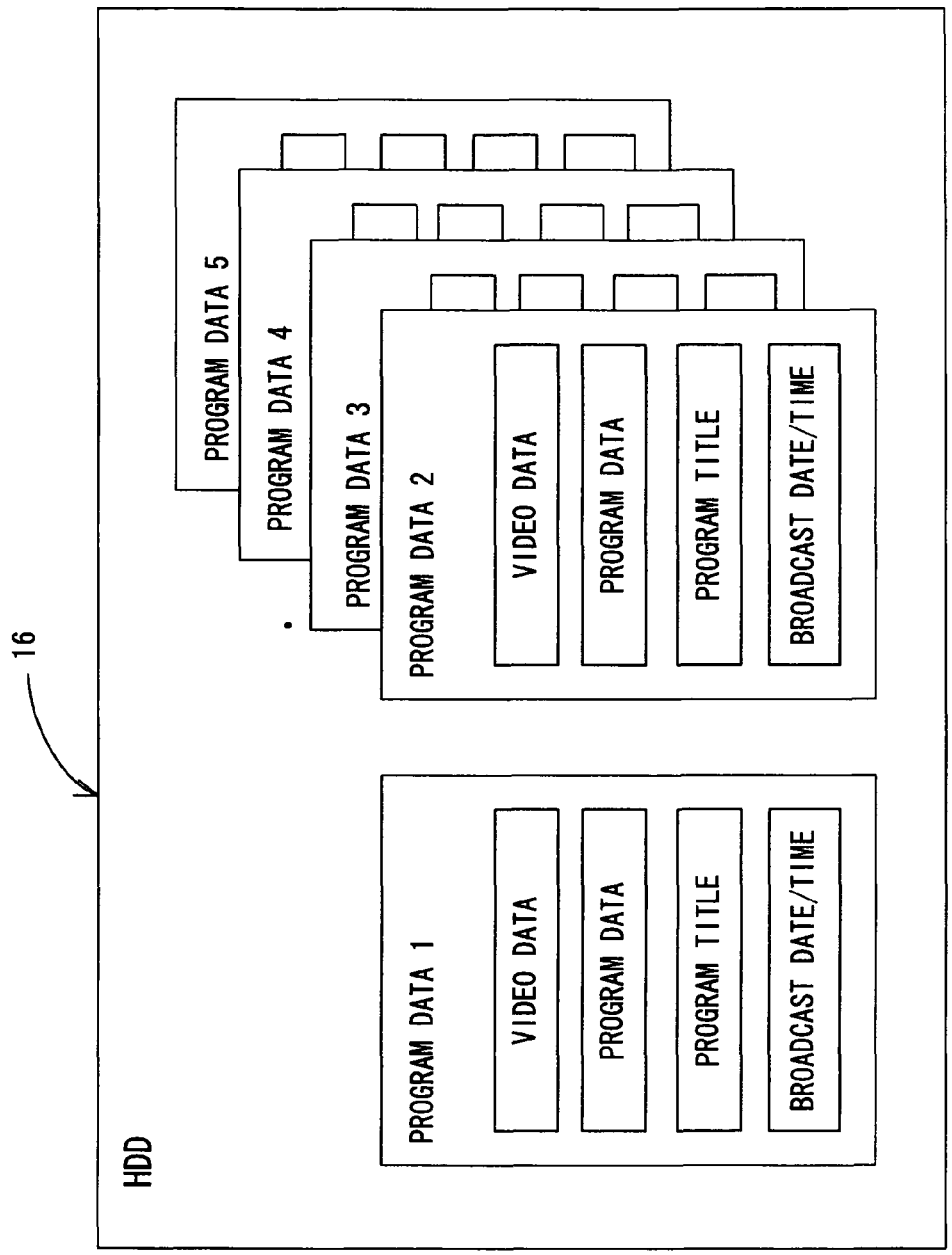
FIG. 3 is a schematic view showing contents of data of television programs recorded on an HDD of the television program recording/reproducing device.

FIG. 3 is a schematic view showing contents of data of television programs recorded on the HDD 16. As shown in FIG. 3, multiple program data (program data 1 to program data 5, for example) on multiple television programs are recorded on the HDD 16. Each program data of each television program includes video data, audio data, a title and broadcast date/time of the each television program. As described above, the CPU 11 controls the HDD 16 to record and read these program data on and from the HDD 16. In this way, the video data and audio data of each of multiple television programs are recorded on the HDD 16 by being associated with the title and broadcast date/time of the each television program.

Figure 4A:
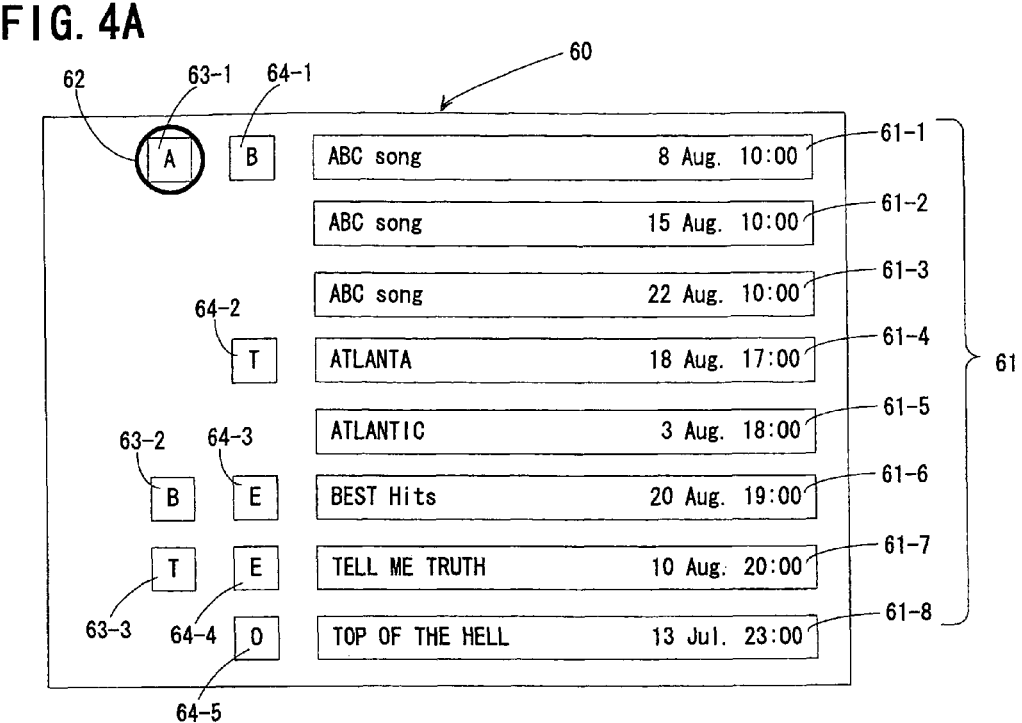
FIG. 4A is a schematic view of a reproduction program selection screen for a user to select a television program to be reproduced.

FIG. 4A is a schematic view of a reproduction program selection screen 60 for a user to select a television program to be reproduced. The reproduction program selection screen 60 is displayed on the display 3 when the user presses the program key 40. The reproduction program selection screen 60 contains: a title list image 61 including titles of television programs recorded on the HDD 16; a cursor image 62 for selecting a title of an optional television program from the title list image 61; and frame images 63-1, 63-2, 63-3, 64-1, 64-2, 64-3, 64-4 and 64-5, for example, on and between which the cursor image 62 can move.

The title list image 61 contains multiple title images 61-1 to 61-8, for example. The number of title images 61 displayed on the title list image 61 is the same as the number of television programs recorded on the HDD 16. Each of the title images 61-1 to 61-8 displays a title and broadcast date/time of a television program corresponding to the each title image that are recorded on the HDD 16. The title list image 61 displays these title images 61-1 to 61-8 sequentially in alphabetical order of the titles of the television programs. Note that if the HDD 16 has recorded multiple television programs with the same title, the title list image 61 displays the same title television programs sequentially in order of broadcast date/time. In the example shown in FIG. 4A, the first three title images 61-1 to 61-3 have the same title "ABC song", so that they are displayed sequentially in order of broadcast date/time.

On the other hand, the frame images 63-1, 63-2 and 63-3 are those which are to be used for initial letter selection, and on and between which the cursor image 62 is moved, more specifically moved by each unit of title(s) of television program(s) having the same initial letter (beginning letter) displayed on the title list image 61. If the title list image 61 has multiple titles having the same initial letter (as in the title images 61-1 to 61-5 with the initial "A", and the title images 61-7 and 61-8 with the initial "T"), one frame image (63-1 or 63-3) is displayed for such multiple titles with the same initial. If the title list image 61 has a single title, not multiple titles, with a certain initial letter (as in the title image 61-6) as well, one frame image (63-2) for initial letter selection is displayed for such single title. In other words, the number of frame images (63-1, 63-2 and 63-3) for initial letter selection is the same as the number of different kinds of initial letters of titles displayed on the title list image 61.

More specifically, in the example shown in FIG. 4A, the initial letter of the titles displayed on the title images 61-1 to 61-5 is "A", so that one frame image 63-1 for initial letter selection is displayed for these title images 61-1 to 61-5. The frame image 63-1 for initial letter selection has a letter "A" displayed thereon in order to indicate that it corresponds to the initial letter "A" of each title. Further, the initial letter of the title displayed on the title image 61-6 is "B", which is a single title with the initial letter "B", so that one frame image 63-2 for initial letter selection is displayed for this title image 61-6. The frame image 63-2 for initial letter selection has a letter "B" displayed thereon in order to indicate that it corresponds to the initial letter "B" of the single title. Similarly, the initial letter of the titles displayed on the title images 61-7 and 61-8 is "T", so that one frame image 63-3 for initial letter selection is displayed for these title images 61-7 to 61-8. The frame image 63-3 for initial letter selection has a letter "T" displayed thereon in order to indicate that it corresponds to the initial letter "T" of each title.

Next, the frame images 64-1 to 64-5 are those which are to be used for second letter selection among the title(s) of television program(s) having the same initial letter, and on and between which the cursor image 62 is moved, more specifically moved by each unit of title(s) of television program(s) having the same second letter with the same initial letter displayed on the title list image 61. If the title list image 61 has multiple titles having the same initial letter and the same second letter (as in the title images 61-1 to 61-3, and the title images 61-4 and 61-5), one frame image (64-1 or 64-2) is displayed for such multiple titles with the same initial and the same second letter. If the title list image 61 has a title or titles, each with a certain initial letter and a certain second letter (as in each of the title images 61-6, 61-7 and 61-8) as well (not multiple titles with both the same initial letter and the same second letter), one frame image (61-6, 61-7 or 61-8) is displayed for such title or titles. In other words, the number of frame images (64-1 to 64-5) for second letter selection is the same as the number of different kinds of second letters of titles in the respective same initial letters including the number of single combinations of an initial letter with a second letter.

More specifically, in the example shown in FIG. 4A, the second letter of the titles displayed on the title images 61-1 to 61-3 with the same initial letter "A" is "B", so that one frame image 64-1 for second letter selection is displayed for these titles 61-1 to 61-3. The frame image 64-1 for second letter selection has a letter "B" displayed thereon in order to indicate that it corresponds to the second letter "B" of each title. Further, the second letter of the titles displayed on the title images 61-4 and 61-5 with the same initial letter "A" is "T", so that one frame image 64-2 for second letter selection is displayed for these titles 61-4 and 61-5. The frame image 64-2 for second letter selection has a letter "T" displayed thereon in order to indicate that it corresponds to the second letter "T" of each title.

On the other hand, the title image 61-6 of the single title with the initial letter "B" has a second letter "E", so that one frame image 64-3 for second letter selection is displayed on the title 61-6. The frame image 64-3 for second letter selection has a letter "E" displayed thereon in order to indicate that it corresponds to the second letter "E". Furthermore, the title images 61-7 and 61-8 with the same initial letter "T" have second letters "E" and "O", respectively, so that the title images 61-7 and 61-8 have a single combination of the initial letter "T" with the second letter "E" and a single combination of the initial letter "T" with the second letter "O", respectively. Thus, the frame images 64-4 and 64-5 for second letter selection are displayed on the titles 61-7 and 61-8, respectively. The frame images 64-4 and 64-5 for second letter selection have letters "E" and "O" displayed thereon, respectively, in order to indicate that they correspond to the second letters "E" and "O", respectively.

Figure 4B:
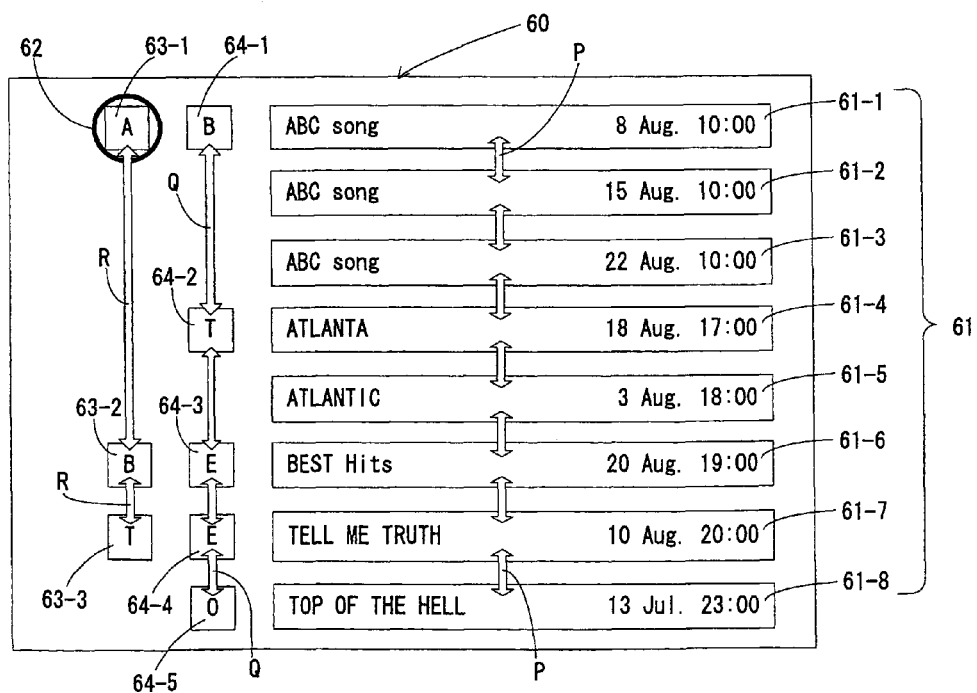
FIG. 4B is also a schematic view of the reproduction program selection screen for a user to select a television program to be reproduced, and shows how a cursor image is moved.

FIG. 4B is also a schematic view of the reproduction program selection screen 60 for a user to select a television program to be reproduced, and shows how the cursor image 62 is moved. When a user presses the cursor key 43 or 44 of the remote control 19, the cursor image 62 is moved between the column of the title images 61-1 to 61-8 and the column of the frame images 64-1 to 64-5 for second letter selection, and between the column of the frame images 64-1 to 64-5 for second letter selection and the column of the frame images 63-1 to 63-3 for initial letter selection.

When on the column of the title images 61-1 to 61-8, the cursor image 62 is on either one of the title images 61-1 to 61-8. When the user presses the cursor key 41 or 42 of the remote control 19 while the cursor image 62 is on one of the title images 61-1 to 61-8, the cursor image 62 is moved one row upward or downward to next row on and between the title images 61-1 to 61-8, as shown by arrow P in FIG. 4B. Further, when on the column of the frame images 64-1 to 64-5 for second letter selection, the cursor image 62 is on either one of the frame images 64-1 to 64-5. When the user presses the cursor key 41 or 42 of the remote control 19 while the cursor image 62 is on one of the frame images 64-1 to 64-5, the cursor image 62 is moved one frame image upward or downward to next frame image on and between the frame images 64-1 to 64-5, as shown by arrow Q in FIG. 4B. Similarly, when on the column of the frame images 63-1 to 63-3 for initial letter selection, the cursor image 62 is on either one of the frame images 63-1 to 63-3. When the user presses the cursor key 41 or 42 of the remote control 19 while the cursor image 62 is on one of the frame images 63-1 to 63-3, the cursor image 62 is moved one frame image upward or downward to next frame image on and between the frame images 63-1 to 63-3, as shown by arrow R in FIG. 4B.

Note that if the HDD 16 has too many television programs recorded thereon to display the title images 61-1, and so on, on one screen of the display 3, a remaining or additional screen(s) is prepared in the television program recording/reproducing device 1. In order to display the additional screen(s), a user operates the remote control 19 to move the cursor image 62 to the lowermost position or row on the screen (i.e. the position of either one of the title image 61-8, the frame image 64-5 for second letter selection and the frame image 63-3 for initial letter selection in the example shown in FIG. 4B), and then press the cursor key 42, whereby the current reproduction program selection screen 60 is scrolled upward to display a remaining or subsequent reproduction program selection screen, if any. Similarly, by moving the cursor image 62 to the uppermost position on the screen, and pressing the cursor key 41 of the remote control 19, the reproduction program selection screen 60 is scrolled downward to display a remaining or additional reproduction program selection screen, if any.

For television program selection, the user presses the cursor keys 41, 42, 43 and/or 44 to move the cursor image 62 onto a selected title image corresponding to a television program to be reproduced (one of the title images 61-1 to 61-8), and then presses either the reproduction key 34 or the decision key 45 of the remote control 19 so as to start reproducing the television program corresponding to the selected title image (namely selected title).

As apparent from the above description, the television program recording/reproducing device 1 makes it possible to move the cursor image 62 to a position or row, or a neighboring position or row, of a title image (e.g. one of the title images 61-1 to 61-8) having a desired title of a television program, to be reproduced, with a higher probability of a smaller number of operations of pressing the cursor keys 41 and/or 42 by moving the cursor image 62 on and between the frame images for initial letter selection (e.g. the frame images 63-1 to 63-3) than by moving the cursor image 62 on and between the title images (e.g. the title images 61-1 to 61-8). Thus, by first moving the cursor image 62 on and between the frame images for initial letter selection (e.g. the frame images 63-1 to 63-3), and then moving the cursor image 62 on and between the title images (e.g. the title images 61-1 to 61-8), a desired title image (namely desired title) can be selected by the cursor image 62 with a higher probability of a smaller number of operations of pressing the cursor keys 41, 42, 43 and/or 44 than by directly moving the cursor image 62 on and between the title images.

Furthermore, the television program recording/reproducing device 1 makes it possible to move the cursor image 62 to a position or row, or a neighboring position or row, of a title image (e.g. one of the title images 61-1 to 61-8) having a desired title of a television program, to be reproduced, with a higher probability of a smaller number of operations of pressing the cursor keys 41 and/or 42 by moving the cursor image 62 on and between the frame images for second letter selection (e.g. the frame images 64-1 to 64-5) than by moving the cursor image 62 on and between the title images (e.g. 61-1 to 61-8). Thus, by first moving the cursor image 62 on and between the frame images for initial letter selection (e.g. the frame images 63-1 to 63-3), and then moving the cursor image 62 on and between the frame images for second letter selection (e.g. the frame images 64-1 to 64-5), and thereafter moving the cursor image 62 on and between the title images (e.g. the title images 61-1 to 61-8), a desired title image (namely desired title) can be selected by the cursor image 62 with a higher probability of a still smaller number of operations of pressing the cursor keys 41, 42, 43 and/or 44 than by directly moving the cursor image 62 on and between the title images.

It is to be noted that the present invention is not limited to the above embodiments, and various modifications are possible. For example, although the title list image 61 in the above-described embodiments displays the title images 61-1 to 61-8 sequentially in alphabetical order of the titles of the television programs, it is possible to display the title images sequentially in syllabary order such as order of the Japanese syllabary, for example. Further, if the number of television programs recorded on the HDD 16 is small, it is possible to omit displaying the frame images 64-1 to 64-5 for second letter selection. Similarly, if the number of television programs recorded on the HDD 16 is small, it is possible to omit displaying the frame images 63-1 to 63-3 for initial letter selection. In addition, the television program recording/reproducing device 1 can be designed such that it can switch between display and non-display of the frame images 63-1 to 63-3 and/or the frame images 64-1 to 64-5 for second letter selection according to user setting.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A television program recording/reproducing device comprising:
   a tuner for receiving a television broadcast signal transmitted from a broadcast station;
   a filter for subjecting the television broadcast signal received by the tuner to signal processing to separate, from the received television broadcast signal, video data, audio data and EPG (Electric Program Guide) data of a television program;
   a program recording unit for recording video data and audio data of each television program, separated by the filter, so as to be readable;
   a video decoder for subjecting the video data of each television program separated by the filter and video data of each television program read from the program recording unit to signal processing to generate video signals for reproducing video of each television program on a display connected to the television program recording/reproducing device;
   an audio decoder for subjecting the audio data of each television program separated by the filter and audio data of each television program read from the program recording unit to signal processing to generate audio signals for reproducing audio of each television program to a speaker connected to the television program recording/reproducing device;
   an operation unit operated to command various operations of the television program recording/reproducing device;
   a program recording control unit for controlling a recording operation of recording the video data and audio data of each television program separated by the filter onto the program recording unit;
   a program information display control unit for controlling a display operation of displaying, on the display, information about the video data and audio data of each television program recorded on the program recording unit; and
   a program reproduction control unit for controlling reading of the video data and audio data of each television program recorded on the program recording unit, and further controlling outputting of these data to the video decoder and the audio decoder,
   wherein the program recording control unit records, on the program recording unit, the video data and audio data of the each television program separated by the filter by associating these video and audio data of the each television program with a title of the each television program contained in the EPG data of the each television program separated by the filter,
   wherein the program information display control unit displays, on the display, a title list image containing a list of titles of the television programs recorded on the program recording unit as well as a cursor image for selecting a title of an optional television program from the title list image, and moves the cursor image on the titles of the title list image according to operation of the operation unit, wherein the program reproduction control unit reads, from the program recording unit, video data and audio data of a television program corresponding to the title selected by the cursor image, and outputs the read video data and audio data of the television program to the video decoder and the audio decoder, respectively, wherein the program information display control unit displays the titles of the television programs sequentially in alphabetical order or syllabary order on the title list image, wherein if the title list image has multiple titles having the same initial letter, the program information display control unit displays a frame image of the same initial letter for initial letter selection for the multiple titles having the same initial letter, the cursor image being movable on the frame image(s) for initial letter selection, in which the frame image of the same initial letter for initial letter selection for the multiple titles having the same initial letter is displayed separate from and associated with the multiple titles having the same initial letter on the display, wherein the program information display control unit moves the cursor image on the titles of the title list image and on the frame image(s) for initial letter selection, wherein if the multiple titles having the same initial letter contain multiple titles having the same second letter, the program information display control unit displays a frame image of the same second letter for second letter selection for the multiple titles having the same second letter, the cursor image being movable on the frame image(s) for second letter selection in which the frame image of the same second letter for second letter selection for the multiple titles having the same second letter is displayed separate from and associated with the multiple titles having the same second letter on the display, and wherein the program information display control unit moves the cursor image on the titles of the title list image, and on the frame image(s) for initial letter selection, and further on the frame image(s) for second letter selection.

2. The television program recording/reproducing device according to claim 1, wherein the program recording control unit records, on the program recording unit, the video data and audio data of the each television program separated by the filter by associating these data of the each television program with the title and broadcast date/time of the each television program, wherein the program information display control unit displays the titles of the television programs sequentially in alphabetical order or syllabary order on the title list image, and displays multiple same titles, if any, contained in the title list image sequentially in order of the broadcast date/time, wherein if the title list image has multiple titles having the same initial letter, the program information display control unit displays a frame image of the same initial letter for initial letter selection for the multiple titles having the same initial letter, the cursor image being movable on the frame image(s) for initial letter selection, in which the frame image of the same initial letter for initial letter selection for the multiple titles having the same initial letter is displayed separate from and associated with the multiple titles having the same initial letter on the display, wherein even if the title list image has a single title(s) with a certain initial letter, the program information display control unit displays a frame image(s) of the same initial letter for initial letter selection for such single title(s) separate from and associated with the single title(s) with the certain initial letter on the display, wherein if the multiple titles having the same initial letter contain multiple titles having the same second letter, the program information display control unit displays a frame image for second letter selection for the multiple titles having the same second letter, the cursor image being movable on the frame image(s) for second letter selection, in which the frame image of the same second letter for second letter selection for the multiple titles having the same second letter is displayed separate from and associated with the multiple titles having the same second letter on the display, wherein even if the multiple titles having the same initial letter are of single combinations of the initial letter with the second letters, the program information display control unit displays frame images for second letter selection for such single combinations separate from and associated with the multiple titles having the same second letters, and wherein the program information display control unit moves the cursor image on the titles of the title list image, and on the frame image(s) for initial letter selection, and further on the frame image(s) for second letter selection.

3. The television program recording/reproducing device according to claim 1, wherein frame images of initial letters are displayed in a first column and frame images of second letters are displayed in a second column.

* * * * *